3,350,975
SELF-THREADING NUT
Alfred A. Bien, Birmingham, Mich., assignor to Chrysler Corporation, Highland Park, Mich., a corporation of Delaware
Birmingham, Mich. 48010
Filed Dec. 23, 1965, Ser. No. 515,932
7 Claims. (Cl. 85—32)

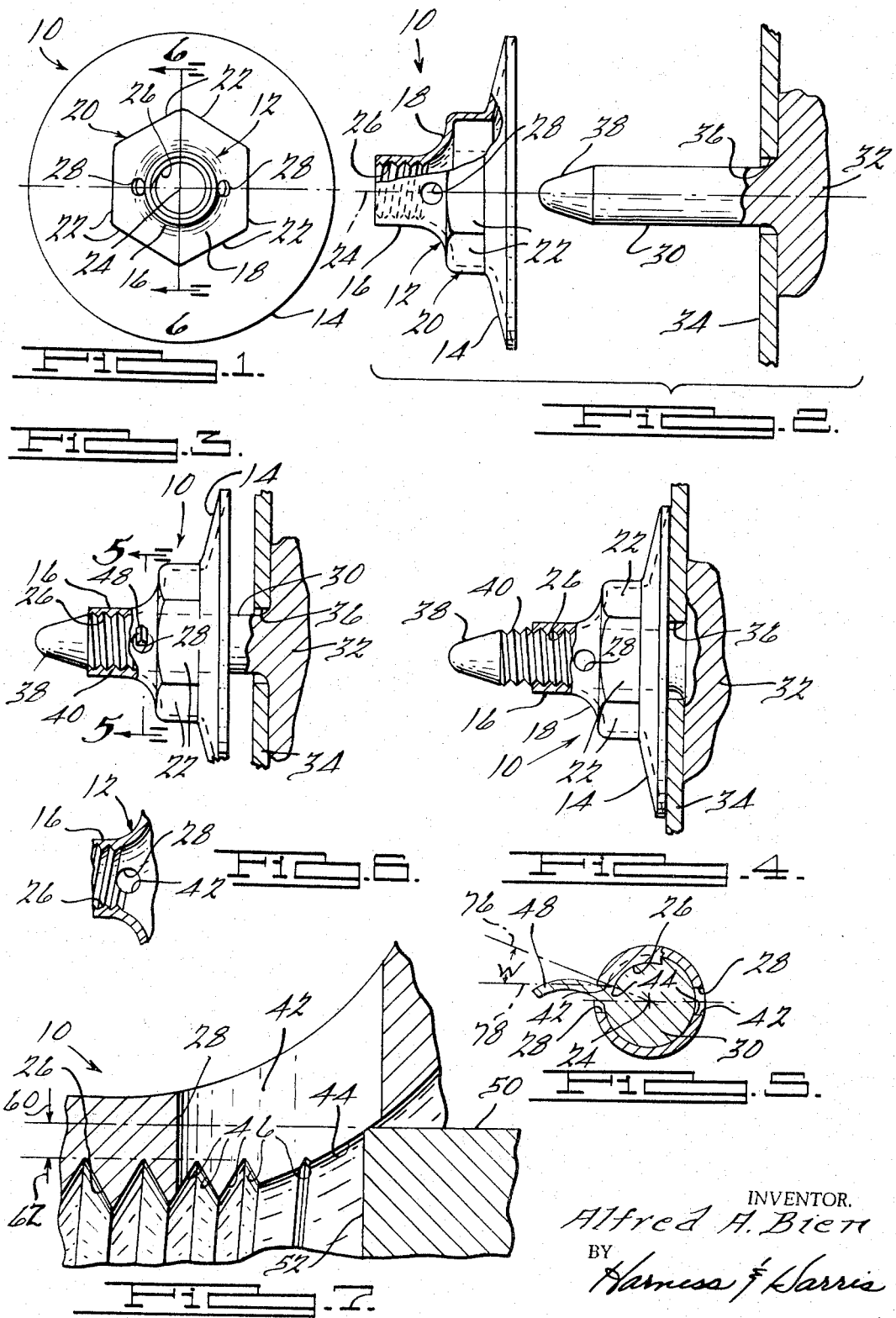

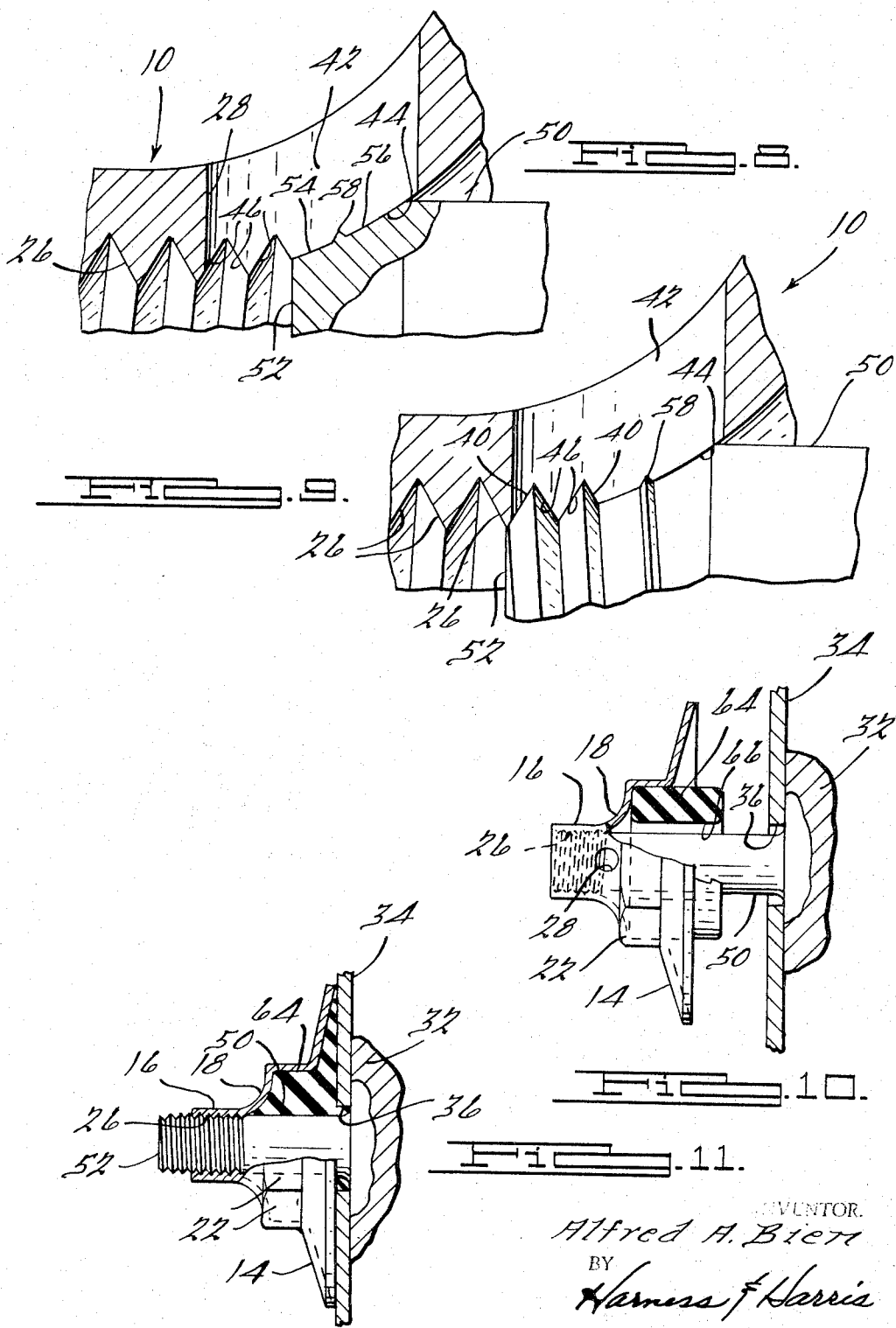

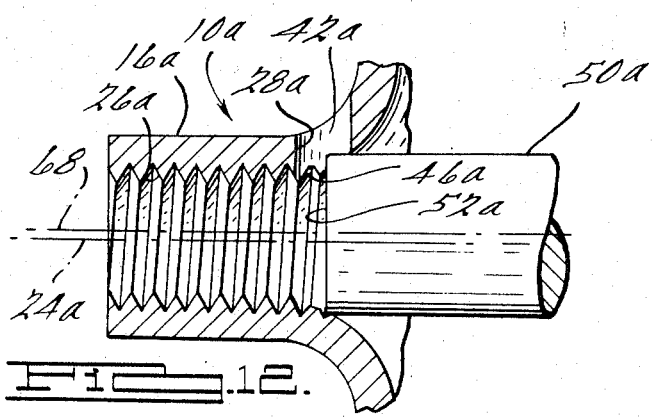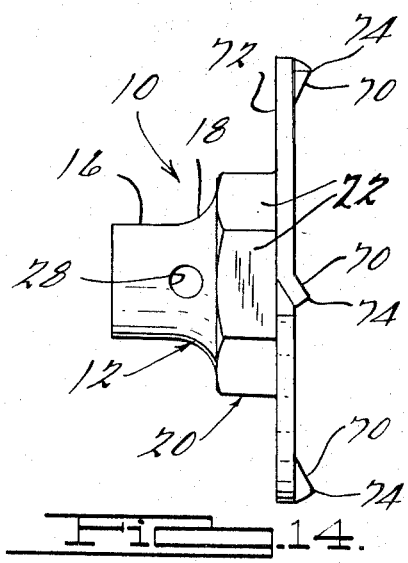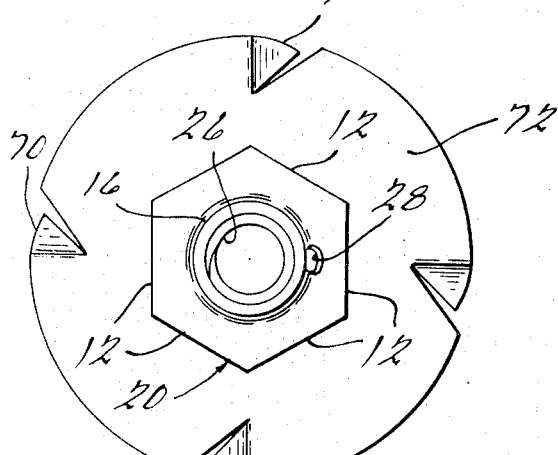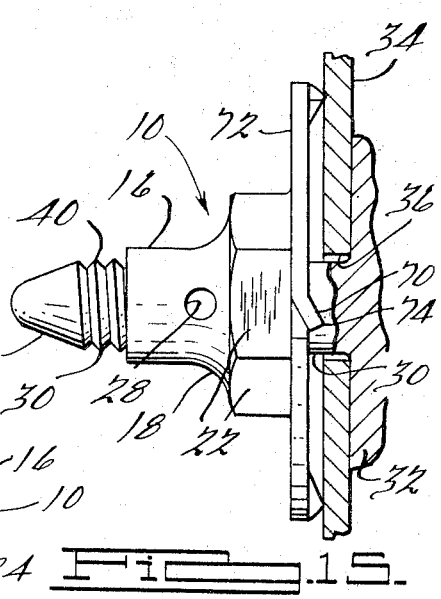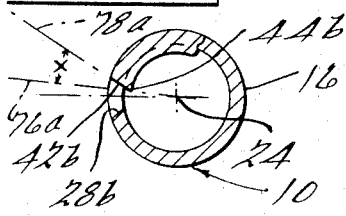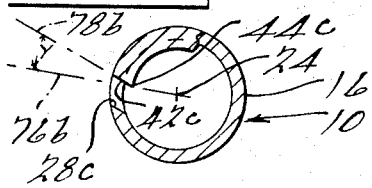

This invention relates generally to a fastening device and more particularly to a fastening device in the class generally described as sheet metal self-threading nuts.

In many instances in manufacturing it has been found to be considerably cheaper, where component parts are to be fastened to each other as by a cooperating nut and stud, to have the stud unthreaded and to have the nut capable of forming an external thread into the stud as the nut is turned onto the stud. This results, of course, in the immediately obvious savings of not having to previously thread the cooperating stud by some previous machining operation.

Various forms of self-threading nuts have been proposed by the prior art and such can be classified broadly into the following three categories. The first category is comprised of those self-threading nuts which are formed of sheet metal and having a body portion of a configuration adaptable for engagement by a driving tool such as a wrench. The body portion of such a self-threading nut is usually provided with an end wall formed integrally therewith which extends generally transverse to the nut body. The said end wall is usually provided with a generally centrally located aperture formed therethrough which has edges formed so as to present cutting edges for engaging a cooperating unthreaded stud and thereby cutting threads into the stud.

The cutting edges are formed so as to be segments of a helical path, the axis of which is substantially coincident with the intended axis of travel of the nut body as it is rotated about the cooperating stud. In such self-threading nuts, a plurality of cutting edges are normally provided and, if the particular nut happens to have two cutting edges, the edges are located generally diametrically opposed with respect to each other about the said axis so as to present opposed cutting surfaces or edges about the cooperating unthreaded stud. If the nut happens to be one which has more than two cutting edges, then such edges are arranged so as to be in a pattern of a regular polygonal configuration so as to tend to equalize all of the tangential or torque forces experienced during the threading of the stud. Regardless of the number of cutting edges employed by a particular nut, the cutting edges are formed so as to be located generally in the same axial position with respect to said axis. This, again, is done so that all forces that will be incurred during the threading of the stud will occur as closely as possible to identical axial positions along the unthreaded stud, thereby tending to preclude undesirable cocking of the self-threading nut as it progresses along the stud.

As a consequence of arranging the cutting edges in the manner described above, an undesirable feature does exist, which is, that the pitch and lead of the thread cut into the stud can never be of equal values. In such cases, the lead will be at least twice the pitch and it is impossible to cut only a single continuous thread form onto the stud. A double thread will always be formed if the two cutting edges are employed and three or more separate threads will be formed when three or more cutting edges are employed. It should be appreciated that as the number of threads increase, the lead of the threaded stud also increases thereby increasing the helix angle and minimizing the frictional forces existing between the cutting edge of the nut and the already threaded portion of the stud. The minimizing of such frictional forces, of course, enhances the possibility that the nut will become loosened from its engaged position because of such things as vibrations occurring during use of the articles so joined.

Even though the cutting edges are provided as described above in an attempt to assure that the nut will progress along the unthreaded stud in a manner so as to be generally coaxial therewith, it has been found that in actual practice this is not the case. The usual experience, especially where high volume production is concerned, is that the nut starts out in a somewhat cocked position with respect to the axis of the stud and continues in such a cocked position until the leading end of the nut engages, for example, one of the work pieces to be secured by the nut and stud. When this happens, the leading end of the nut does not engage the said work piece simultaneously at all points but rather first, because of its cocked position, engages the workpiece and then tends to align itself with the axis of the stud as the nut is further turned onto the stud. Consequently, during this period of moving from a cocked position to one of substantial alignment, the cutting edges are precluded from advancing in accordance with the helical lead thereof and instead form a continuous annular groove about the stud rather than a thread form. The formation of such a groove causes a peening-over of some of the metal of the stud into the previously formed threads thereby precluding the removal of the nut therefrom. In such instances where the groove is thusly formed, the nut not only causes such peening of the metal but also loses much of its holding force which it would otherwise normally exert against the work piece. Accordingly, the situation results in one where the self-threading nut cannot perform its intended function of tightly engaging the work piece and at the same time cannot be removed and replaced by a second nut because of the peened-over metal which precludes its removal from the stud.

In addition to the above, a further disadvantage exists in such prior art sheet metal self-threading nuts which is that the nut does not provide even one full thread for engagement between the nut and the cooperating stud. This arises because of the thread cutting segments which necessarily require the provision of spaces as between segments and such spaces are ineffective for engaging the thread cut into the stud. Consequently, this greatly minimizes the force which the nut can be expected to exert against the work piece since all of the axial force supplied by the nut must be carried by the thread cutting segments.

Further, it has been found that in order to have such a sheet metal nut capable of engaging and threading a cooperating stud, the stud itself must be provided with a leading end which has a substantial taper formed thereon. The provision of such a tapered portion permits the placement of the nut thereon so that the thread can be started in the tapered portion as the nut is forced axially thereagainst. The elimination of such a tapered portion, as for example, by breakage (many of the studs are formed as an integral part of a die cast member) would result in having the nut incapable of even starting a thread on that stud.

It should, of course, be apparent that since the outer diameter of the stud is in most instances approximately equal to the major diameter of the thread to be cut on the stud, that a stud having a blunt end of a diameter equal to either said outer diameter or said major diameter would not present any surface which the cutting edges of the nut could use for starting to cut the intended thread.

The second category of self-threading nuts includes what may be considered a common internally threaded nut provided with internally formed fluted portions, which may be either helically or axially directed through the threads. The fluted portions, by passing through the internally formed threads, form a plurality of cutting edges along the length of the internally formed thread. In such arrangements there is a similarity with the sheet metal type of nut described as being within the first category. The similarity is that in the sheet metal self-threading nut individual thread cutting edges are provided so as to enable each of the edges to cut a thread, whereas, in the second category of nuts, segments are also provided by virtue of the generally axially directed flutes whether these flutes be parallel to or spiraled with respect to the axis of the internal threads. In such a nut, a plurality of interrupted threads are formed by virtue of the fluted portions. Each of the thread segments acts as a threading die and therefore provision must be made for chip clearance. Such clearance is provided by the generally axially directed flutes.

Even though such self-threading nuts are superior to those comprising the first category, they nevertheless are considerably more expensive than the sheet metal type of nut, and, if used in quantities of for example, millions a year, the cost thereof can be prohibitive. Most of the cost is, of course, incurred by the requirement of providing said fluted portions.

In addition to the above, it can be seen that even though the nuts of the second category of self-threading nuts provide more contact area between internally formed threads of the nut and those which the nut cuts into the cooperating stud that still there are not any full threads since each of the threads is interrupted by the fluted portions.

As in the first category, the nuts within the second category also require the provision of a tapered lead portion on all the cooperating unthreaded studs. This is required for the reasons explained above and accordingly an absence of such a tapered lead would prevent the use of such a self-threading nut.

In relatively recent years the prior art has also proposed the use of a third category of self-threading nuts which have the internal thread thereof formed therein as by a rolling operation. Such threads, unlike those of the first two categories of self-threading nuts, do not possess any cutting edge or surface. The manner in which such a nut forms threads along the unthreaded stud is by means of metal flow within the stud so as to expand part of the metal forming the stud in a manner generally radially outwardly to fill the major diameter of the internally formed thread. One of the major drawbacks of such an arrangement is that dimensional tolerances are necessary in the manufacture of both the rolled thread within the nut as well as the outer diameter of the cooperating unthreaded stud. Accordingly, if in the process of manufacture, the rolled thread is made to dimensions approaching the maximum tolerance thereby increasing both the minor and major diameter of the thread while the cooperating stud is manufactured to dimensions approaching the tolerance limit on the smaller side, then a very small or shallow thread form is produced on the stud by the self-threading nut. Consequently, there is a very slight engagement between the major thread diameter of the stud and the minor diameter of the nut resulting in a high incidence of thread stripping during assembly operations.

As in the case of the first two categories of self-threading nuts, and for the same reason, the third category also requires the provision of a tapered lead portion on the cooperating stud.

All of the above self-threading nuts, especially those in the first and third categories possess further undesirable characteristics among which is the inability of the nut to consistently stop rotation of the nut-driving tool when a predetermined force is exerted against the components by the nut.

In the first two categories of self-threading nuts, there is a limited amount of engagement between the threaded portion of the stud and the thread segments carried by the nut. Accordingly, in order to avoid overstressing of the nut threads it is necessary that the tightening torque that is brought to bear on the nut threads during the tightening of the nuts be suitably limited. This becomes a problem where mass production is desired and assembly-line techniques are employed.

For example, in the production of automobiles, high-speed power wrenches are employed for driving the self-threading nuts. The power wrenches vary not only in brand and size but also vary in types and degree of wear. Even though the power wrenches are usually provided with adjustable clutches which can be set to vary the torque at which the clutches start to slip, the torque scale on the wrenches is often in increments too large for accurate adjustment. Additionally, especially after some degree of wear has taken place in the wrench, the accuracy of calibration reflected by the available increments of adjustment is often lost.

A further influencing factor is the inertial characteristics of the wrench itself. That is, because of the mass of the rotating wrench socket and chuck, an additional uncontrolled force is directed against the nut which is being tightened thereby.

Many other variable factors also present themselves during tightening of the nut. For example, a seal or sealing compound is often employed between the nut and one of the members secured thereby. The amount of resistance provided by the sealing means is not constant due to, for example, imbedded foreign particles, moisture, consistency of material and temperature. All of these variables, of course, are reflected by variations in the tightening torque developed against the nut threads.

As a consequence of the above, an extremely great percentage of self-threading nuts which are applied by power wrenches usually result in being either stripped themselves or stripping the stud onto which they were applied. Another great percentage of those which are not stripped result in assemblies which are not properly secured because of an insufficient amount of torque applied to the nut during the tightening operation. For example, the self-threading nuts of the prior art, as exemplified by the first category, when applied to a one-quarter inch diameter die-cast stud will require approximately forty inch-pounds of torque in order to merely cut a thread in the stud and the stripping torque (that torque at which the threads of either the nut or the stud will be failed) is approximately 100 inch-pounds. This means that there is a total of only sixty inch-pounds between the stripping torque and that torque necessary to cut a thread in the stud. It would, of course, be desirable to have the nut apply a holding force, against the components of the assembly which it is securing, of a value which is as close as possible to but not exceeding the stripping torque. However, as discussed above, because of the variations experienced in nut tightening wrenches, a substantial safety margin has to be provided in order to assure slippage of the wrench clutch prior to the attainment of the stripping torque.

Accordingly, the wrenches, as a matter of good practice, are usually set so that they will apply a nominal torque of 65 inch-pounds at the time that the wrench clutch slips. However, because of the variations experienced by the high-speed power wrenches, the 65 inch-pounds of torque is strictly a nominal value and usually varies anywhere from fifty to eighty inch-pounds. It should be remembered that the worse possible condition is to have the threads strip on either the stud or the nut because this makes the subsequent removal of the nut a virtual impossibility without first breaking off the coacting stud portion.

Depending on the particular type of self-threading nut employed, variations in the applied tightening torque will be necessary. That is, with the self-threading nuts of the first category, a much greater safety factor, percentage-wise, will have to be employed since there are only usually two small thread-like segments carried by the nut. As the number of threads in the nut increase, or the area of contact increases, such as those within the second and third categories, the amount of safety factor diminishes even though it remains a substantial percentage of the overall tightening torque applied by the wrench.

Another major disadvantage exists with regard to at least most of the prior art self-threading nuts. This disadvantage becomes most evident when the sheet metal self-threading nut of the first category is considered and is its inability to be universal with respect to an unthreaded stud and a previously machine-threaded stud. It can be appreciated that the nut, because of its double thread characteristics, will not be capable of being placed onto a previously threaded stud which was threaded to have a conventional screw thread. This, of course, means that, for the most part, the self-threading nuts of the prior art are for all practical purposes limited to single specific applications and may not be used in other areas where previously threaded nuts or screws are employed for joining components of an assembly.

Accordingly, a general object of this invention is to provide a self-threading nut which overcomes the above disadvantages of the prior art.

Another object of this invention is to provide a sheet metal type of self-threading nut which is capable of forming a thread on an unthreaded stud as well as being suitable for application to a previously threaded stud or screw having a machined or preformed thread formed thereon.

Another object of this invention is to provide a self-threading nut which, when approaching a finally tightened condition, rapidly develops and exhibits a resisting force of a magnitude far in excess of the nut or stud stripping torque.

Another object of this invention is to provide a self-threading nut which is capable of threading an unthreaded stud even though the diameter of the stud is greater than the major diameter of the nut-thread.

A further object of this invention is to provide a self-threading nut which is capable of threading an unthreaded stud regardless of whether or not the stud is provided with a tapered lead portion.

Other objects and advantages of this invention will become apparent when reference is made to the following written description considered in conjunction with the accompanying drawings wherein:

FIGURE 1 is a top plan view of a self-threading nut constructed in accordance with the teachings of this invention;

FIGURE 2 is a side elevational view of the nut of FIGURE 1, with portions thereof broken-away and in cross-section, shown in a position immediately prior to start of the threading operation to be performed by the nut on a cooperating unthreaded stud;

FIGURES 3 and 4 illustrate the nut of FIGURE 2 in various stages of forming a thread on a cooperating unthreaded stud;

FIGURE 5 is a cross-sectional view taken generally on the plane of line 5—5 of FIGURE 3 and looking in the direction of the arrows;

FIGURE 6 is a fragmentary cross-sectional view taken generally on the plane of line 6—6 of FIGURE 1 and looking in the direction of the arrows;

FIGURES 7, 8 and 9 are views of enlarged fragmentary portions, in cross-section, of a nut, constructed in accordance with this invention, and a cooperating unthreaded stud during various stages of the threading operation;

FIGURE 10 illustrates a nut, constructed in accordance with this invention, immediately prior to the start of a threading operation to be performed on a stud and in combination with an improved sealing member;

FIGURE 11 illustrates the nut and sealing member of FIGURE 10, at the end of the threading operation, securing two members to each other;

FIGURE 12 is a fragmentary axial cross-sectional view similar to FIGURE 7 illustrating a second embodiment of this invention;

FIGURES 13 and 14 are respectively top plan and side elevational views of another embodiment of this invention;

FIGURE 15 is a view similar to FIGURE 4 but showing the nut of FIGURES 13 and 14; and FIGURES 16, 17 and 18 are views similar to FIGURE 5 illustrating further modifications of the invention.

Referring now in greater detail to the drawings, FIGURES 1 and 2 illustrate a self-threading nut 10, constructed in accordance with this invention, as being comprised of a nut body 12 and an integrally formed radiating flange 14.

Nut body 12 is comprised of a generally tubular section 16 which is joined as by an arcuate section 18 to an enlarged portion 20 which is of a configuration adapted for engagement by a suitable tool. As seen in FIGURE 1, side surfaces 22 of portion 20 are preferably formed so as to define a hexagonal configuration about the centerline 24 of nut 10.

Tubular section 16 is provided with a single continuous internally formed helical thread 26 which is preferably of a total length sufficient to make at least four complete turns, or in other words, have a total axial lead equivalent to four times the thread pitch. Thread 26 is also formed to conform to established screw-thread standards in order to threadably receive a standard externally threaded screw or stud.

Nut body 12 also has holes or apertures 28 formed through the wall thereof and positioned axially of the nut body so that at least one of the holes intersects the thread 26.

FIGURE 2 also illustrates an unthreaded stud 30 which may be formed integrally with a member, fragmentarily illustrated at 32, to be mounted on a suitable cooperating support member 34. Support member or panel 34 is provided with an aperture 36 formed therein for the reception of the stud 30 therethrough. As is often accepted practice, the stud 30 is provided with a tapered lead portion 38 at the projecting end thereof.

FIGURES 3 and 4 illustrate nut 10 in various degrees of engagement with stud 30. As will be noted from FIGURE 3, the nut 10 has already started threading the stud 30 and progressed a substantial distance axially of the stud 30. In so doing, an external thread 40 has been progressively formed on the stud 30.

The means for forming thread 40 is provided by the intersection of hole 28 with the internal thread 26 of nut 10. That is, the surface defining aperture 28 serves to provide an interruption in the thread 26 and the interruption thereby forms a surface with a cutting edge of a configuration conforming to the axial cross-sectional profile of the internal thread 26. For example, referring to FIGURES 5, 6 and 7, the aperture 28 is axially located so as to intersect a leading portion of the thread 26 thereby forming a generally radially extending surface 42 (FIGURES 5 and 6) which in turn forms a cutting edge 44. Because of the intersection of the surface 42 with the thread 26, at least a portion of the cutting edge 44, as best seen in FIGURE 7, has a profile 46 conforming to the thread 26. As the self-threading nut 10 is turned onto the unthreaded stud 30, the thread-profile 46 of the cutting edge 44 engages the stud 30 and proceeds to cut a complementary outer thread form 40 into the unthreaded stud 30. Aperture 28, in addition to forming a cutting edge or surface, also provides a continual clearance for the passage therethrough of cutting chip 48 resulting from the threading operation performed by the nut 10 on the stud 30.

With regard to FIGURES 3 and 4, it can be seen that the self-threading nut 10 forms a thread 40 in stud 30 and that as it forms thread 40 the following portion of thread 26 immediately and continuingly engages the cut thread 40 thereby causing forward axial movement of the nut 10. As nut 10 is further rotated it continues its axial movement along stud 30 toward the panel 34 until such time as the flange 14 abuts against the panel 34. As soon as the flange engages panel 34 and draws member 32 thereagainst the resisting force tending to prohibit further rotation of nut 10 quickly increases to a value which can be employed as a signal for actuating the clutch mechanism of an associated nut-driving tool, such as a high speed power wrench. As a consequence of the rapidly increasing resisting force the possibility of causing the nut 10 to strip the threads of the stud is, for all practical purposes, completely eliminated.

The invention as thus far disclosed by FIGURES 1, 2, 3 and 4 illustrates the self-threading nut acting upon a stud which is provided with a tapered lead portion 38. However, one of the important advantages of this invention is the ability of the self-threading nut to accept and thread unthreaded studs which do not have any tapered lead portion. This ability is illustrated by FIGURES 7, 8 and 9 which show an unthreaded stud 50, with a generally blunt or squared end surface 52, in various axial positions relative to the self-threading nut 10.

Referring in greater detail to FIGURES 7, 8 and 9, it can be seen that as nut 10 is moved toward stud 50 and rotated that the cutting edge 44 will engage the outer surface of stud 50 and start to cut the stud. Such cutting of the stud 50 continues as the nut 10 is both rotated and moved axially relative to the stud 50. FIGURE 8 illustrates the change in the shape of the leading end of the blunt stud 50 resulting from the cutting action of cutting edge 44. It should be noted that the diameter of the leading end of stud 50 has been reduced in size, as indicated by the portions 54 and 56 and that a partial thread 58 has been formed which separates the portions 54 and 56. It should of course be apparent that as soon as the partial thread 58 starts to form on stud 50 further relative axial movement between stud 50 and nut 10 is determined by their relative rotational movement.

With reference to FIGURE 9, it can be seen that as nut 10 is turned further onto stud 50 the previously established partial thread 58 is increased in depth by the cutting action of contoured cutting edges 46 thereby assuming the full thread configuration of thread 40.

In view of the above it is evident that the invention provides an important advantage over the prior art that being the ability to thread a stud regardless of whether or not the stud is provided with a tapered lead portion.

FIGURES 7, 8 and 9 also illustrate another important advantage of the invention, that being the ability of the self-threading nut to accept and thread over-size unthreaded studs regardless of whether or not such studs are provided with a tapered lead portion. For example, the stud 50, as illustrated in FIGURES 7, 8 and 9 has been purposely shown to have a diameter substantially greater than the outer or major diameter of the internal thread 26. Graphically, this difference in radius is illustrated by the oppositely directed arrows 60 and 62 of FIGURE 7. In view of the previous description of the cutting action with regard to FIGURES 7, 8 and 9, it should be apparent that the self-threading nut according to this invention is capable of accepting and threading an unthreaded stud which is even substantially greater in diameter than the major diameter of the internal thread 26.

In some applicators, sealing means must be provided in order to preclude, for example, moisture seeping through the aperture 36 of the panel member 34. With the self-threading fasteners of the prior art, it has been accepted practice to provide a solid disc seal of gum-like material placed across the leading end of the fastener transverse to the fastener axis of rotation. As a consequence, when the fastener is placed onto the stud, the stud first has to penetrate the gum-like disc seal and in so doing carries with it a portion of the disc seal. The gum-like material, in addition to presenting an unsightly appearance, causes variations in the thread-cutting resisting force.

It is contemplated that in those situations requiring sealing means, a generally annular seal 64 will be provided in combination with the self-threading fastener 10 as shown in FIGURE 10. The seal may be made of resilient rubber-like material or, if so desired, may be comprised of gum-like material. It can be seen that as a consequence of the annular configuration of seal 64, that the inner diameter 66 thereof permits the free passage therethrough of the stud 50. As the nut 10 is threaded onto the stud 50 and progresses closer to panel 34, the available space for seal 64 diminishes thereby forcing the seal material tightly about stud 50 and into the available space between aperture 36 and stud 50 as illustrated in FIGURE 11.

Thus far the invention has been disclosed in its preferred form, that being, the provision of a plurality of apertures 28 which are located substantially at the same axial position relative to the axis of the nut body. However, the invention may be practiced with the use of a single aperture 28a as illustrated by FIGURE 12 wherein elements like or similar to those of FIGURES 1–9 are identified with like reference numerals provided with a suffix "a."

With the provision of a single aperture 28a there will be a tendency to cause the axis 68 of the stud 50a to be disposed slightly eccentrically of nut axis 24a. This is illustrated in exaggerated form in FIGURE 12. However, much as in FIGURES 7, 8 and 9, the cutting edges of cutting surface 42a will engage the leading end of stud 50a and start to cut it thereby enabling the profiled cutting edges 46a to start to cut a thread, such as 40 of FIGURE 9, into the stud 50.

In order to even more rapidly increase the nut driving torque at the precise moment that a sufficient tightening torque has been applied to the nut and components assembled thereby, a plurality of barb-like tabs 70 can be struck from the flange 72 as illustrated in FIGURES 13, 14 and 15 wherein all elements which are like those of FIGURES 1–4 are identified with like reference numbers. Flange 72 is of course functionally equivalent to flange 14, the only difference between them is that flange 14 is of a somewhat conical configuration whereas flange 72 is, with the exception of tabs 70, substantially flat and normal to the axis of the nut.

The provision of barbs or tabs 70 is, of course, not restricted to a flat flange normal to the axis of the nut. Such tabs 70 may be provided in the generally conical flange 14 as illustrated in FIGURES 1 through 4.

Referring to FIGURE 15, as nut 10 is driven onto stud 30, a particular torque or force is required in order to cut and form thread 40 thereon. However, as soon as panel 34 and member 32 are drawn together, barbs 70 tend to bite into panel 34 thereby creating an additional force which resists further threading action. This additional resisting force is not dependent upon or related to the force required for the threading action. Accordingly, the additional resisting force developed by the tabs 70 can be employed as a signal for disengaging the clutch of an associated power nut-driving wrench.

If a condition exists wherein panel 34 is somewhat bowed or warped so as not to be in abutting engagement with member 32, barbs 70 will not bite into panel 34 upon initial contact therewith. The barbs 70 will first merely rub against panel 34 as the nut 10 is further rotated until such time as when the panel 34 and member 32 are drawn into abutting relationship. As soon as panel 34 and member 32 achieve abutting engagement further rotation of nut 10 causes the leading ends 74 of tabs 70 to bite into panel 34 and create the increased or additional resisting force previously described.

The tabs or barbs 70 undergo a further action which may not be immediately apparent. Referring to FIGURE 15, it can be seen that as soon as edge 74 of tab 70 starts to bite into panel 34 that further clockwise rotation of the nut 10 (as viewed in FIGURE 13) causes each of the tabs to tend to undergo rotation. For example, referring to FIGURE 15, continued clockwise rotation of nut 10 will cause edge 74 of barb 70 to bite into panel 34 and tend to remain stationary with respect thereto while the remaining portion of flange 72 tends to continue some degree of rotation. Accordingly, such biting action by edge or point 74 causes barb or tab 70 to experience at least a tendency to rotate generally counterclockwise about its juncture with flange 72. Further, because of the generally pointed configuration of tabs 70, as viewed in FIGURE 13, it is possible that each of the biting tabs may, depending on material characteristics and their physical sizes, experience some degree of bending or flexing generally about the same juncture with flange 72.

In addition to the invention as thus far disclosed, it is further contemplated that apertures 28 and 28a may in fact be of a configuration different from that as illustrated by FIGURES 1 through 15. Examples of such differing configurations are shown in FIGURES 16 17, and 18, each of which is a cross-sectional view similar to that of FIGURE 5 with the exception that the stud 30 is not shown therein.

With reference to FIGURE 5, it can be seen that if a line 76 is drawn from the center of nut 10, (axis 24) through the cutting edge 44 that an angle W exists between line 76 and a line 78 which is a projection from the cutting surface 42. As viewed in FIGURE 5, cutting action by nut 10 occurs when the nut 10 is rotated counter-clockwise with respect to stud 30. It will also be observed that line 78 is also disposed generally counter-clockwise of line 76. Accordingly, angle W may be referred to as being a negative cutting angle since the cutting surface 42 is inclined toward the direction of the relative cutting motion of the nut 10 as measured generally from the cutting edge 44.

In contrast to the cutting surface 42 of FIGURE 5, the cutting surfaces as shown by FIGURES 16, 17 and 18 each exhibit a positive cutting angle. For example, referring to FIGURE 16 it can be seen that a line 76a drawn from the center axis 24 and passing through a cutting edge 44b creates an angle X with a line 78a which is a projection of the cutting surface 42b. In comparing FIGURES 5 and 16 it will be noted that in the configuration of FIGURE 16, line 78a is disposed generally clockwise of line 76a. Accordingly, angle X can be considered to be a positive cutting angle. With a positive cutting angle the material removed from stud 30 is not required to curl either directly radially outwardly or to curl generally back in the direction of the cutting motion as it passes through the aperture 28b. Aperture 28b can, of course, be formed in the nut 10 as by a conical cutter.

In FIGURE 17, a line 76b passing through the center axis 24 and a cutting edge 44c creates an angle Y with a line 78b which is a projection of the cutting surface 42c. As in FIGURE 16 line 78b is disposed generally clockwise of line 76b and angle Y, as angle X, is therefore considered to be a positive cutting angle. Aperture 28c may in fact be generally circular having a generally cylindrical surface of which a portion forms cutting surface 42c. Aperture 28c departs from apertures 28 and 28b mainly by the fact that its centerline or axis does not pass through axis 24 but instead is so directed as to cause the cutting surface 42c to be disposed in a manner whereby the resulting angle Y, as described above, defines a positive cutting angle.

Referring to FIGURE 18, a line 76c passing through the center axis 24 and a cutting edge 44d creates an angle Z with a line 78c which is drawn through the cutting edge 44d and is tangent at that point to the cutting surface 42d. As in FIGURES 16 and 17, angle Z also represents a positive cutting angle. It is contemplated that aperture 28d can be formed in nut 10 as for example by a milling cutter indicated generally at 80.

The various apertures 28, 28b, 28c and 28d are exemplary of various forms of apertures which may be employed to form a cutting surface and edge in the self-threading nut as disclosed herein and the various cutting angles and surfaces may of course be altered, if desired, in order to obtain optimum cutting action with regard to the material forming the member to be threaded.

The internal thread 26 of nut 10 is preferably formed therein as by a rolling operation thereby causing the thread to have a degree of increased hardness so as to enhance its cutting abilities.

In addition to the various advantages already explained, another important advantage exists, that being the ability of the self-threading nut to operatively threadably engage any pre-threaded stud or screw of the same nominal thread size.

Accordingly, it can be seen that such self-threading nuts of this invention could even be employed as a substitute for conventional nut fasteners in situations where, because of oversight or any other reason, a supply of such conventional nut fasteners has been temporarily exhausted.

It is contemplated that the self-threading nut as disclosed herein, including the various modifications thereof, can be fabricated by a method which includes the steps of forming the nut body 12 and flange from a continuous coil of strip steel such as, for example, SAE 1050, in a sequential progressive die. It is well known in the art that a progressive die is one that accepts a continuous strip of steel and performs a multiple of operations on the strip steel at regularly spaced stations so that as the strip steel progresses from one end of the die to the other end, a finished part, such as the self-threading nut, is completed and ejected from the progressive die at each cycle of the die operation.

For example, strip steel would be fed into a suitable progressive die and a blank would be formed at the first die station and possibly simultaneously the blank would be partly drawn into a cup-like shape. Next, as the strip steel and blank are moved to the following die station, a further drawing operation would take place and change the configuration of the cup-like shape to one possibly closely approximating the cross sectional configuration of self-threading nut as illustrated for example in FIGURE 2. The number of die stations required to form a finished nut body, without the internal thread and the thread cutting aperture, is of course dependent on the size characteristics of the metal used for forming the nut as well as the physical limitations of the press which houses the die. Progressive dies are also capable of having attachments placed thereon so as to perform other operations which are not considered to be pure drawing operations such as forming a thread as by a rolling operation and forming apertures as by means of suitably directed punches.

Accordingly, it is contemplated that a nut according to this invention would be formed generally in a progressive die and that after the general configuration of the nut was determined that a thread such as internal thread 26, would be formed preferably by a rolling operation so as to enhance the hardness of the metal forming the thread and that subsequently cutting apertures such as any of those disclosed herein would be formed thereby completing the self-threading nut. It is conceivable that the internal thread of the nut could be formed as by a tapping operation; however, it is preferable that it be performed by rolling for reasons already given. Further, a self-threading nut according to this invention is completely capable of performing its intended function even if the cutting apertures, such as 28, are formed in the wall of the nut body prior to the formation of the internal thread. However, it has been determined through experiments that the self-threading nut exhibits a better performance if the thread cutting apertures are formed subsequent to the formation of the internal thread.

Although only a select number of embodiments and modifications of the invention have been disclosed and described it is apparent that other embodiments and modifications of this invention are possible within the scope of the appended claims.

I claim:

1. A one piece sheet metal self-threading nut comprising a generally tubular portion, a radially outwardly flaring joining portion joined to said tubular portion and flaring radially outwardly therefrom, a continuous thread formed in said tubular portion internally thereof, at least one aperture formed generally transversely through said nut in a manner so as to extend through said thread, said aperture also being formed as to pass through said outwardly flaring joining portion, a first internal cutting edge having a projected profile of a configuration closely approximating an axial cross-section of said internal thread formed by the intersection of said aperture and said internal thread, a second internal cutting edge having a projected profile of a configuration closely approximating an axial cross section of said radially outwardly flaring portion formed by the intersection of said aperture and said outwardly flaring joining portion, said second cutting edge being effective for engaging an unthreaded member having an outer diameter greater than the major diameter of said internal thread and being further effective upon rotation thereagainst to cut said unthreaded member in order to reduce said outer diameter to a size at least closely approaching the said major diameter of said internal thread, said first cutting edge being effective upon further rotation of said nut against said unthreaded member for further cutting that portion of said unthreaded member previously cut by said second cutting edge in order to cut into said unthreaded member an external thread form which will threadably mate with said internal thread, and a tool engaging surface carried by said nut adapted to be engaged by a suitable tool for drivingly rotating said nut against said unthreaded member.

2. A one piece sheet metal self-threading nut according to claim 1 including an integrally formed radially directed flange, said flange being axially positioned as to have said outwardly flaring joining portion between said flange and said tubular portion, and means carried by said flange and projecting therefrom for engaging a joining member being fastened to said unthreaded member as said nut is being tightened against said joining member, said means being effective to produce a greater resistance to rotation of said nut in the tightening direction than resistance to rotation of said nut in a loosening direction after said nut has been fully tightened against said joining member.

3. A one piece sheet metal self-threading nut according to claim 1 including an integrally formed radially directed flange, said flange being axially positioned as to have said outwardly flaring joining portion between said flange and said tubular portion, and a plurality of tab-like barbs formed in said flange and projecting therefrom, said barbs being disposed relative to said flange in a direction which normally causes said barbs to bite into a joining member being fastened to said unthreaded member as said nut is being tightened against said joining member, said barbs being effective to produce a greater resistance to rotation of said nut in the tightening direction than the resistance to rotation of said nut in a loosening direction.

4. A one piece sheet metal self-threading nut according to claim 1 including a second aperture formed generally transversely through said nut, said second aperture being formed so as to be located at substantially the same axial position with respect to said tubular portion as is the said one aperture, said second aperture also defining at least a third cutting edge effective for engaging an unthreaded member having an outer diameter greater than the major diameter of said internal thread, said third cutting edge also being effective upon rotation of said nut against said unthreaded member for cutting said unthreaded member in order to reduce said outer diameter to a size at least closely approaching the said major diameter of said internal thread.

5. A one piece sheet metal self-threading nut according to claim 4 including an integrally formed radially directed flange, said flange being axially positioned as to have said outwardly flaring joining portion between said flange and said tubular portion, and means carried by said flange and projecting therefrom for engaging a joining member being fastened to said unthreaded member as said nut is being tightened against said joining member, said means being effective to produce a greater resistance to rotation of said nut in the tightening direction than resistance to rotation of said nut in a loosening direction after said nut has been fully tightened against said joining member.

6. A one piece sheet metal self-threading nut according to claim 2 including an integrally formed radially directed flange, said flange being axially positioned as to have said outwardly flaring joining portion between said flange and said tubular portion, and a plurality of tab-like barbs formed in said flange and projecting therefrom, said barbs being disposed relative to said flange in a direction which normally causes said barbs to bite into a joining member being fastened to said unthreaded member as said nut is being tightened against said joining member, said barbs being effective to produce a greater resistance to rotation of said nut in the tightening direction than the resistance to rotation of said nut in a loosening direction.

7. A one piece sheet metal self-threading nut comprising a first generally tubular portion, a radially outwardly flaring joining portion joined to said tubular portion and flaring radially outwardly therefrom, a second generally tubular portion joined to the radially outwardly flaring joining portion so as to have said joining portion between said first tubular portion and said second tubular portion, a tool engaging surface formed on said second tubular portion for engagement by a suitable tool to drivingly rotate said nut against and onto an unthreaded shank member, a radially directed flange formed integrally with said second tubular portion and radiating outwardly therefrom, a continuous thread formed in said first tubular portion internally thereof, at least one aperture formed through said nut in a manner so as to extend through said thread, said aperture also being formed as to pass through said outwardly flaring joining portion, a first internal cutting edge having a projected profile of a configuration closely approximating an axial cross-section of said radially outwardly flaring joining portion formed by the intersection of said aperture and said outwardly flaring joining portion, a second internal cutting edge having a projected profile of a configuration closely approximating an axial cross-section of said internal thread formed by the intersection of said aperture and said internal thread, said first cutting edge being effective for engaging an unthreaded member having an outer diameter greater than the major diameter of said internal thread and being further effective upon rotation thereagainst to cut said unthreaded member in order to reduce said outer diameter to a size at least closely approaching the said major diameter of said internal thread, said second cutting edge being effective upon further rotation of said nut against said unthreaded member for further cutting that portion of said unthreaded member previously cut by said first cutting edge in order to cut into said unthreaded member an external thread form which will threadably mate with said internal thread, and a plurality of tab-like barbs formed in said flange and projecting therefrom at an angle with respect to the axis of rotation of said nut and inclined so as to be at a slope which is in the same general direction as the helix angle of said internal thread, said barbs being effective for biting into a joining member being fastened to said unthreaded member as said nut is being tightened against said joining member, said barbs being effective for producing a greater resistance to rotation of said nut in the tightening direction than the resistance to rotation of said nut in the loosening direction.

References Cited

UNITED STATES PATENTS

| | | | |
|---|---|---|---|
| 417,393 | 12/1889 | McAllister | 10—111 |
| 1,956,745 | 5/1934 | Payne | 151—37 |
| 2,140,467 | 12/1938 | Cargile | 85—47 |
| 2,761,349 | 9/1956 | Heller | 85—32 |
| 3,086,421 | 4/1963 | Hamman | 151—37 |
| 3,164,055 | 1/1965 | Duffy | 151—38 |

FOREIGN PATENTS

| | | |
|---|---|---|
| 90,053 | 5/1870 | France. |
| 982,539 | 1/1951 | France. |
| 896,595 | 5/1963 | Great Britain. |

EDWARD C. ALLEN, *Primary Examiner.*

CARL W. TOMLIN, *Examiner.*

M. PARSONS, JR., *Assistant Examiner.*